United States Patent
Li et al.

(10) Patent No.: US 8,577,853 B2
(45) Date of Patent: Nov. 5, 2013

(54) PERFORMING ONLINE IN-PLACE UPGRADE OF CLUSTER FILE SYSTEM

(75) Inventors: Jinyuan Li, Sunnyvale, CA (US); Murali Vilayannur, San Jose, CA (US); Mayank Rawat, Sunnyvale, CA (US); Satyam B. Vaghani, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 64 days.

(21) Appl. No.: 13/212,002

(22) Filed: Aug. 17, 2011

(65) Prior Publication Data

US 2013/0046740 A1    Feb. 21, 2013

(51) Int. Cl.
*G06F 17/30* (2006.01)
(52) U.S. Cl.
USPC .......................................... 707/695; 707/803
(58) Field of Classification Search
USPC .................. 707/695, 802–803; 717/127, 174
See application file for complete search history.

(56) References Cited

U.S. PATENT DOCUMENTS

| | | | |
|---|---|---|---|
| 7,082,598 B1* | 7/2006 | Le et al. | 717/127 |
| 7,356,679 B1* | 4/2008 | Le et al. | 713/1 |
| 8,296,267 B2* | 10/2012 | Cahill et al. | 707/661 |
| 2009/0106248 A1* | 4/2009 | Vaghani et al. | 707/8 |

OTHER PUBLICATIONS

VMWare "VMware vCenter Update Manager Administrative Guide", vCenter Update Manager 4.0, dated Jul. 21, 2010, pp. 1-124.*

* cited by examiner

*Primary Examiner* — Monica Pyo (57) ABSTRACT

A shared file system for a group of host computer systems is upgraded in-place in a manner that the shared file system can remain online and accessible to the host computer systems. Each host computer system first loads a new file system driver that is backward compatible with a driver that is currently used by them to interact with the file system. Second, one of the host computer systems acquires locks to file system management data structures of the file system, upgrades the file system management data structures, and upon completion thereof, notifies the other host computer system that the upgrade to the file system management data structures is complete.

23 Claims, 5 Drawing Sheets

PERFORMING ONLINE IN-PLACE UPGRADE OF CLUSTER FILE SYSTEM

BACKGROUND

Oftentimes, it is desirable to upgrade a format of a cluster file system to enhance or enable one or more features of the file system. In particular, one might be interested in extending the capacity of files that may be stored within the file system by upgrading the version of a file system from a 32-bit file address format to a 64-bit file address format. Typically, in order to upgrade a 32-bit file address format to a 64-bit file address format, the address of each file included in the file system is padded with thirty-two zeros to make them compatible with the new, 64-bit address format that is expected by any entity performing input/output (IO) operations to the file system. In addition, bit map data structures will have to be expanded to track additional file blocks that can be addressed with the 64-bit file address format.

Presently, performing such upgrades to existing file systems requires that they first be taken "offline," i.e., to a state where all IO activity associated with the file system is stopped. For example, all popular cluster file systems—such as Redhat-GFS, IBM-GPFS, Symantec-CFS, Oracle Solaris GFS, and/or Oracle-OCFS—each require that all IO activity associated with the file system be stopped prior to being upgraded. This is necessary to prevent IO operations being made to the file system during the upgrade process, which could potentially result in corruption.

However, taking a file system offline prevents any entity from accessing the file system until the upgrade to the file system is completed and the file system is brought back online. Further, the latency associated with taking a file system offline is often high due to several tasks that must first be completed. For example, if the file system is stored locally on a desktop computer, all IO operations are first completed, then all open files in the file system are closed. The file system is then unmounted from any entities that are accessing the file system. In another example, if the file system is accessed by one or more virtual machines (VMs) executing on a server, virtual disks of the running VMs, which may be stored as large files in the file system, must be migrated to a different file system on an auxiliary disk to enable the VMs to continue to operate, whereupon the file system is unmounted from the server and the upgrade to the file system is executed. When the upgrade to the file system has completed, the virtual disks are then optionally migrated back from the auxiliary disk. Such auxiliary disk requirements incur "storage bloat" which degrades, e.g., VM migrations, and increase costs to customers.

As a consequence, such current techniques for upgrading a cluster file system impose a significant inconvenience for services that require their file systems to be accessible at all times, such as banking software that requires access to transaction data stored on the file system. Therefore, what is needed is a way to perform an online, in-place upgrade to a file system in an efficient and non-intrusive manner.

SUMMARY

One or more embodiments of the present invention provide a method for performing an online, in-place upgrade of a cluster file system. One advantageous feature of such method is that the cluster file system is not required to be taken offline prior to the file system upgrade is performed. Moreover, no auxiliary disk is required to perform the in-place upgrade of the cluster file system.

A method of upgrading a version of a shared file system according to an embodiment of the present invention does not require the shared file system to be taken offline, and is performed on a shared file system that is supported by at least one storage array and accessed by a plurality of host computer systems, each host computer system including a file system driver for accessing data on the at least one storage array stored in accordance with the shared file system. This method includes the steps of: (i) transmitting a request to each host computer system to upgrade its respective file system driver to a new file system driver that corresponds to the upgraded shared file system, (ii) upon receiving a notification from each of the host computer systems that the host computer system has upgraded its respective file system driver to the new file system driver, transmitting a request to a selected host computer system to upgrade file system management data structures stored in the shared file system for correspondence with the upgraded shared file system, and (iii) transmitting a request to each host computer system to upgrade, for correspondence with the upgraded shared file system, file descriptors for each file for which the host computer system currently holds a file lock. Each file descriptor for any other files whose corresponding file locks are not currently possessed by any of the host computer systems is subsequently upgraded by the new file system driver of a host computer system that next obtains a file lock in order to access the file corresponding to the file descriptor.

A method of upgrading a version of a shared file system to an upgraded shared filed system according to another embodiment of the present invention does not require the shared file system to be taken offline, and is performed on a shared file system that is supported by at least one storage array and accessed by a plurality of host computer systems, each host computer system including an upgraded file system driver compatible with the upgraded shared file system and the at least one storage array storing upgraded file system management data structures compatible with the upgraded shared file system. This method is performed in each of the host computer systems and includes the steps of receiving a request to access a file stored in the shared file system, obtaining access to a file descriptor corresponding to the file and stored in the shared file system, and comparing a version identifier in the file descriptor with a version identifier of the upgraded file system driver of the host computer system. Next, the file descriptor is upgraded for correspondence with the upgraded shared file system if the comparison step determines a difference between the version identifier in the file descriptor and the version identifier of the upgraded file system driver, and enabling access to the file in accordance with the received request.

Further embodiments of the present invention provide a non-transitory computer readable storage medium that includes instructions for causing a computer system to carry out one or more of the methods set forth above.

DETAILED DESCRIPTION

Figure 1:
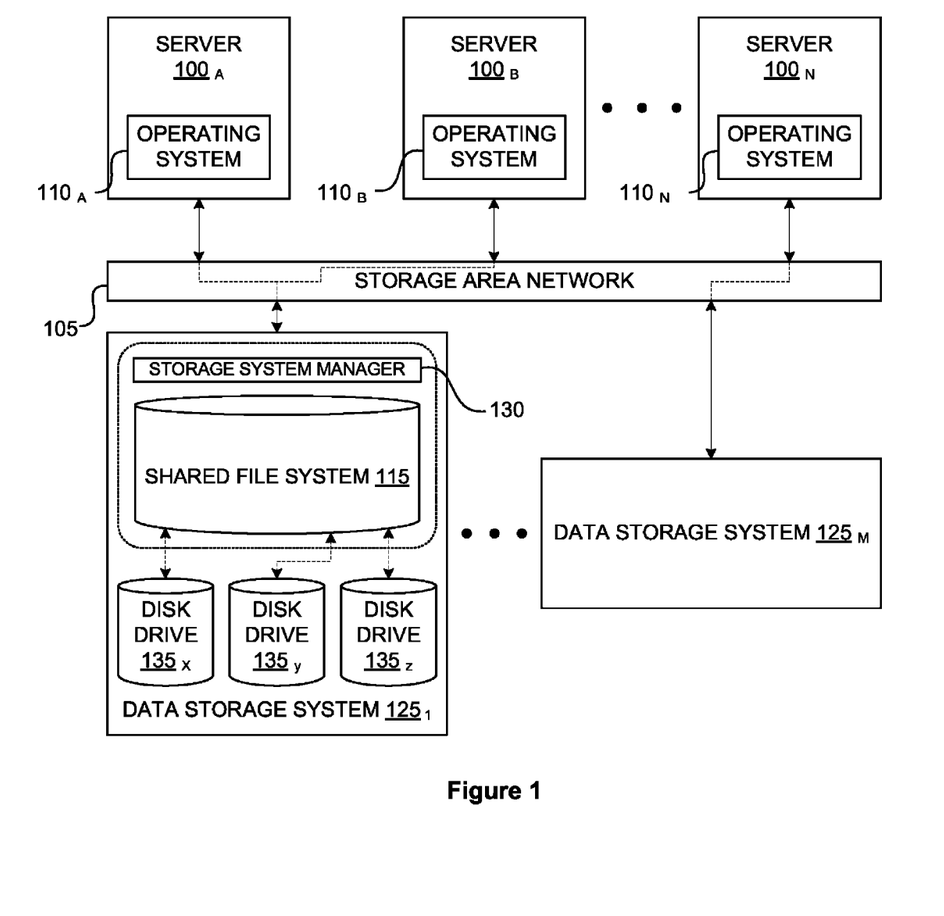
FIG. 1 illustrates a computer system configuration utilizing a shared file system in which one or more embodiments of the present invention may be implemented.

FIG. 1 illustrates a computer system configuration utilizing a shared file system, also known as a cluster file system, in which one or more embodiments of the present invention may be implemented. The computer system configuration of FIG. 1 includes multiple servers $100_A$ to $100_N$, each of which is connected to storage area network (SAN) 105. Operating systems $110_A$ and $110_B$ on servers $100_A$ and $100_B$ interact with a shared file system 115 that resides on a data storage unit (DSU) 120 (illustrated in FIG. 3 and described below) accessible through SAN 105. In particular, DSU 120 is a logical unit (LUN) of one or more data storage systems $125_1$ to $125_M$ (e.g., disk array) connected to SAN 105. While DSU 120 (also referred to herein as LUN 120) is exposed to operating systems $110_A$ and $110_E$ by storage system manager 130 (e.g., disk controller) as a contiguous logical storage space, the actual physical data blocks upon which shared file system 115 may be stored is dispersed across the various physical disk drives $135_X$ to $135_Z$ of data storage system.

Data in DSU 120 (and possibly other DSUs exposed by the data storage systems) is accessed and stored in accordance with structures and conventions imposed by a shared file system 115 that stores such data as a plurality of files of various types, typically organized into one or more directories. Shared file system 115 further includes file system management or metadata data structures that store information, for example, about how data is stored within shared file system 115, such as block bitmaps that indicate which data blocks in shared file system 115 remain available for use, along with other metadata data structures such as file descriptors or inodes for directories and files in shared file system 115. In one embodiment, each of servers 100 is configured with a hypervisor to support the execution of virtual machines each having a virtual disk represented by a file within shared file system 115. One example of shared file system 115 is VMFS (Virtual Machine File System), which is a shared file system for supporting virtual machines available from VMware, Inc. of Palo Alto, Calif.

Figure 2:
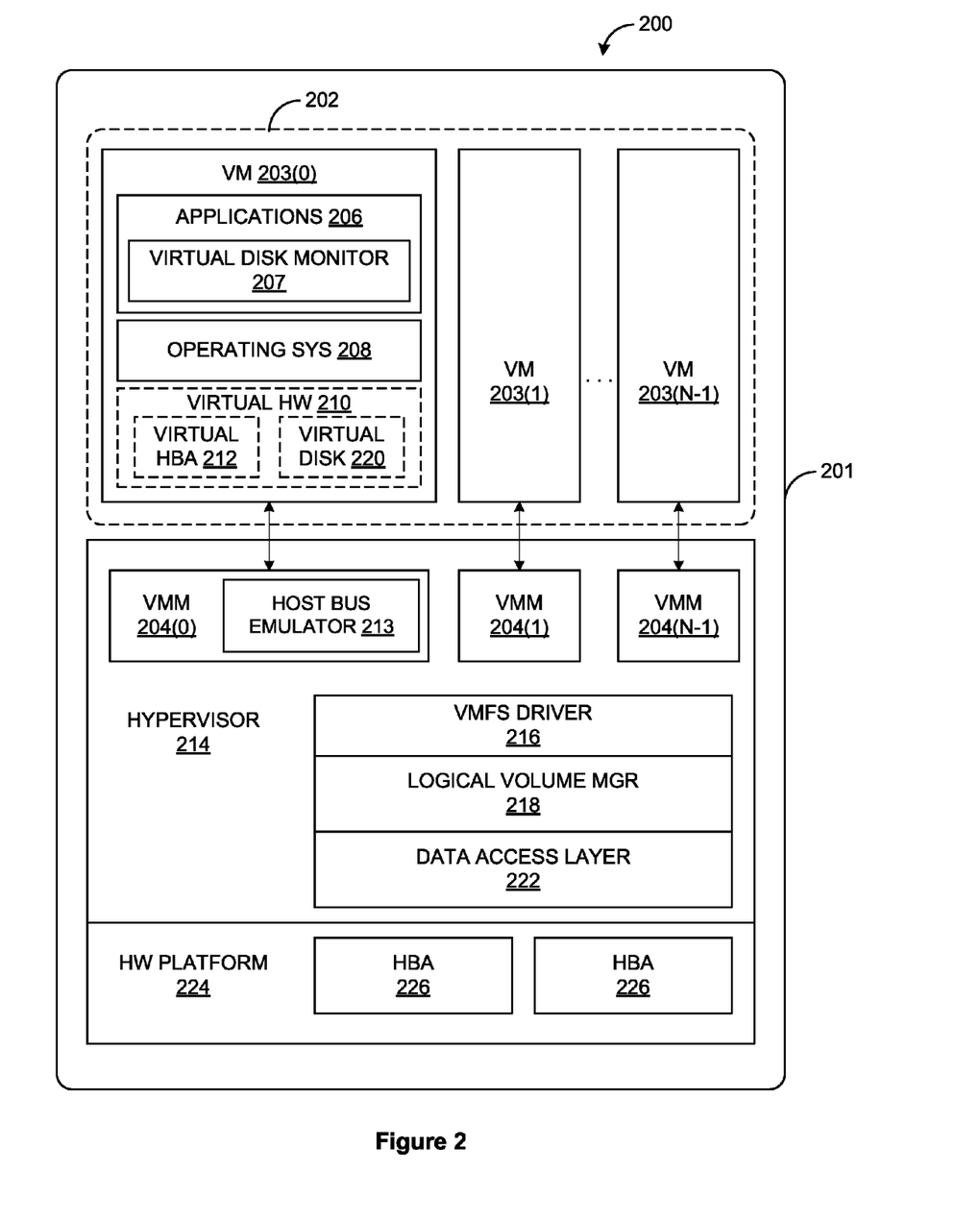
FIG. 2 illustrates a virtual machine based system in which one or more embodiments of the present invention may be implemented.

FIG. 2 illustrates a virtual machine based system 200 in which one or more embodiments of the present invention may be implemented. An integral computer system 201, generally corresponding to one of the computer system servers 100, is constructed on a conventional, typically server-class hardware platform 224, including in particular host bus adapters (HBAs) 226 in addition to conventional platform processor, memory, and other standard peripheral components (not separately shown). The hardware platform 224 executes a hypervisor 214 supporting a virtual machine execution space 202 within which virtual machines (VMs) 203 are executed. In one or more embodiments of the present invention, the hypervisor 214 and virtual machines 203 are implemented using the vSphere™ product developed and distributed by VMware, Inc.

In summary, the hypervisor 214 provides the necessary services and support to enable concurrent execution of the virtual machines 203. In turn, each virtual machine 203 implements a virtual hardware platform 210 as a conceptual layer that supports the execution of a guest operating system 208 and one or more client application programs 206. In one or more embodiments of the present invention, the guest operating systems 208 are instances of Microsoft Windows, Linux and Netware-based operating systems. Other guest operating systems can be equivalently used. In each instance, the guest operating system 208 includes a native file system layer, typically either an NTFS or ext3FS type file system layer. These file system layers interface with the virtual hardware platforms 210 to access, from the perspective of the guest operating systems 208, a data storage host bus adapter. In one implementation, the virtual hardware platform 210 implements a virtual host bus adapter 212 that emulates the necessary system hardware support to enable execution of the guest operating system 208 transparently to the virtualization of the system hardware.

File system calls initiated by the guest operating systems 208 to perform file system-related data transfer and control operations are processed and passed through the virtual host bus adapter 212 to adjunct virtual machine monitor (VMM) layers 204 that implement the virtual system support necessary to coordinate operation with the hypervisor 214. In particular, a host bus emulator 213 functionally enables the data transfer and control operations to be ultimately passed to the host bus adapters 226. File system calls for performing data transfer and control operations generated, for example, by applications 206 are translated and passed to a virtual machine file system (VMFS) driver or component 216 that manages access to files (e.g., virtual disks, etc.) stored in data storage systems (such as data storage system 125) that may be accessed by any of the virtual machines 203. In one embodiment, access to LUN 120 is managed by VMFS driver 216 and shared file system 115 for LUN 120 is a virtual machine file system (VMFS) which represents the organization of files and directories stored in LUN 120, in accordance with structures understood by VMFS driver 216. For example, guest operating systems 208 receive file system calls and perform corresponding command and data transfer operations against virtual disks 220, e.g., virtual SCSI devices accessible through virtual HBA 212, that are visible to the guest operating systems 208. These virtual disks are maintained as files stored on VMFS, for example, in LUN 120. Each such virtual disk may be maintained as a file or set of files stored on VMFS, for example, in DSU 120. Guest operating system 208 file system calls are translated from instructions applicable to a virtual disk visible to the guest operating systems 208 to instructions applicable to a file representing the virtual disk in a LUN exposed by data storage system 125 to VMFS. Such translations are performed through a number of component layers of an "IO stack," beginning at the guest operating system 208 (which receives the file system calls from applications 206), through virtual HBA 212, host bus emulator 213, VMFS driver 216, a logical volume manager 218 which assists VMFS driver 216 with mapping files stored in VMFS with the LUNs exposed by data storage systems networked through SAN 105, a data access layer 222, including device drivers, and host bus adapters 226 (which, e.g., issues a SCSI command to data storage system 125 to access LUN 120).

It should be recognized that the various terms, layers and categorizations used to describe the virtualization components in FIG. 2 may be referred to differently without departing from their functionality or the spirit or scope of the invention. For example, virtual machine monitors (VMM) 204 may be considered separate virtualization components between VMs 203 and hypervisor 214 (which, in such a conception, may itself be considered a virtualization "kernel" component) since there exists a separate VMM for each instantiated VM.

Alternatively, each VMM may be considered to be a component of its corresponding virtual machine since such VMM includes the hardware emulation components for the virtual machine. In such an alternative conception, for example, the conceptual layer described as virtual hardware platform 210 may be merged with and into VMM 204 such that virtual host bus adapter 212 is removed from FIG. 2 (i.e., since its functionality is effectuated by host bus adapter emulator 213).

Figure 3:
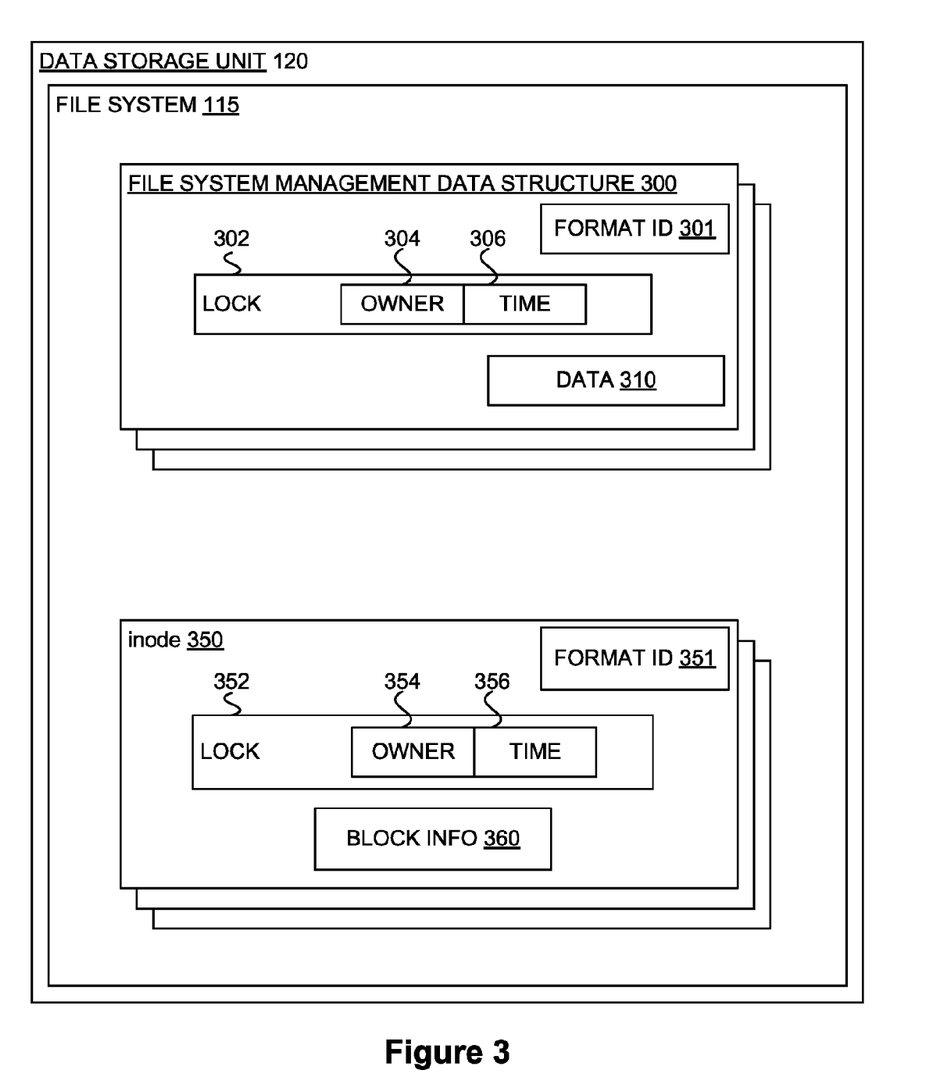
FIG. 3 illustrates a configuration for locking data to enable multiple servers to access a file system concurrently, according to one embodiment of the present invention.

FIG. 3 illustrates a configuration for locking data to enable multiple servers to access a file system concurrently, according to one embodiment of the present invention. In one embodiment, shared file system 115 includes one or more file system management data structures, where each file system management data structure 300 comprises header information including a format ID or version number 301 that identifies a current format or version of file system management data structure 300, that for example, corresponds to a version of shared file system 115. One example of a file system management data structure is a bitmap that indicates used and unused blocks of shared file system 115. A lock 302 for file system management data structure 300 comprises an owner data field 304, a time data field 306. The owner data field 304 may be a unit of data, such as a byte or a word that is used to identify a server that owns or possesses lock 302. Possessing lock 302 gives a server access to file system management data structure 300. In the embodiments of the present invention described herein, lock 302 is possessed exclusively. This means that while the server has exclusive possession of lock 302, other entities cannot acquire lock 302. In general, a lock may be possessed exclusively or in a shared manner, e.g., a multi-writer lock or a read-only lock. Owner data field 304 may contain a zero or some other special value to indicate that no server currently owns lock 302, or it may contain an identification (ID) value of one of the servers to indicate that the respective server currently owns the lock. For example, each of servers 100 may be assigned a unique ID value, which could be inserted into owner field 304 to indicate that the respective server 100 owns lock 302 for file system management data structure 300. A unique ID value need not be assigned manually by a system administrator, or in some other centralized manner. Instead, the ID values may be determined for each of servers 100 in a simpler, more automated manner, such as by using the MAC (Media Access Control) address of the server's network interface card, by using the World Wide Name (WWN) of the server's first HBA, or by using alternative techniques to generate a Universally Unique Identifier (UUID).

In one embodiment, locks, such as lock 302, are owned or possessed by servers on a renewable-lease basis. Details of this technique may be found in U.S. patent application Ser. No. 11/676,109. When a server acquires a lock, it owns the lock for a specified period of time. This specified period of time is often short due to the minor IO operations that are made to the file system management data structure referenced by the lock, such as allocating file blocks within the shared file system 115. The server may extend the period of ownership, or the lease period, by renewing the lease. Once the lease period ends, another server may take possession of the lock. Time data field 306 stores information that indicates whether or not the current lease has expired.

Shared file system 115 also includes data structures, such as file descriptors or inodes for files and directories stored in shared file system 115. Similar to file system management data structure 300 described above, each inode 350 includes a format ID or version number 351 that identifies a current format or version used by the inode. Each inode 350 also includes block information 360 that identifies data blocks to which inode 350 refers, such as physical blocks within shared file system 115 that store data for a file or directory. In addition to the block information 360, each inode 350 is associated with a lock 352. Lock 352 governs access to the underlying data of a file or directory associated with inode 350. Similar to lock 302 of file system management data structure 300, lock 352 comprises an owner data field 354 and a time data field 356. Owner data field 354 contains the same type of information as owner data field 304, and time data field 356 contains the same type of information as time data field 306. In contrast to the typically short lease time of locks 302 to file system management data structures 300, locks 352 to inodes 350 are leased for a longer period of time due to the high amount of IO activity often associated with inodes 350.

One or more embodiments of the present invention provide a technique to perform an online, in-place upgrade of shared file system 115. With this technique, shared file system 115 can remain online and accessible to servers 100 while shared file system 115 is upgraded from a first file system format to a second file system format. As will be further detailed below, each of servers 100 first loads a new file system driver that is backward compatible with a file system driver that is currently used to interact with shared file system 115. Second, one of servers 100 obtains an exclusive lock to the file system management data structures of shared file system 115, upgrades the file system management data structures to support the second file system format, and upon completion thereof, notifies the other servers that the upgrade to the file system management data structures is complete. Finally, each of servers 100 upgrades the format of any inodes 350 to which they currently hold a lock.

Figure 4:
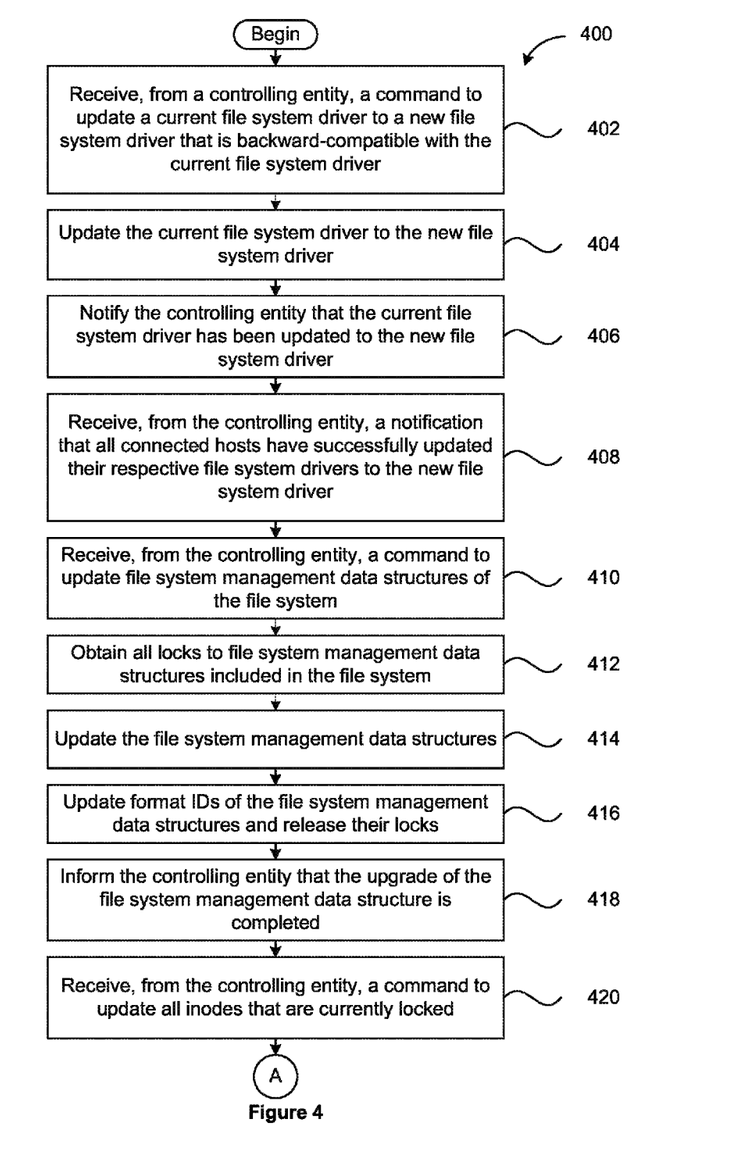
FIG. 4 is a flow diagram of a method for preparing a file system to be upgraded from a first file system format to a second file system format, according to one or more embodiments of the present invention.

FIG. 4 is a flow diagram of a method 400 for preparing shared file system 115 to be upgraded from a first file system format to a second file system format, according to one or more embodiments of the present invention. Although the method steps are described in conjunction with the systems of FIGS. 1-2, it should be recognized that any system configured to perform method 400 is within the scope of the invention.

Method 400 begins at step 402, where server $100_A$ receives, from a centralized, controlling entity, a command to upgrade a current file system driver (e.g., VMFS driver 216 in one embodiment) to a new file system driver that is backward-compatible with the current file system driver. The controlling entity may be any of servers 100 or a separate server. In one embodiment, the controlling entity includes server management software that configures and controls each of the servers 100, such as Virtual Center Server™ software by VMware, Inc. of Palo Alto, Calif. (hereinafter referred to as "vCenter").

At step 404, server $100_A$ upgrades the current file system driver to the new file system driver. In one embodiment, the received command may include the new file system driver so that the server $100_A$ is able to immediately upgrade the current file system driver to the new file system driver. In another embodiment, the received command may include a uniform resource locator (URL) that specifies an address where the new file system driver may be retrieved. In another embodiment, the current file system driver is upgraded as part of upgrade of the server 100a to a new version of hypervisor 214 that includes an upgraded VMFS driver. All VMs that were running on 100a are migrated to another host 100b before the upgrade process is instantiated using technology such as VMotion™ to prevent downtime. Each file system driver includes an ID that is associated with the file system driver, such as a file system driver version number.

At step 406, server $100_A$ notifies the controlling entity that the current file system driver has been upgraded to the new file system driver. Server $100_A$ may notify the controlling entity using, e.g., a local area network (LAN). At step 408, server $100_A$ receives, from the controlling entity, a notification that all of servers 100 have successfully upgraded their current file system drivers to the new file system driver. Such notification is received by server $100_A$ only after each of servers 100 have issued the same successful upgrade notification to the controlling entity.

At step 410, server $100_A$ receives, from the controlling entity, a command to upgrade file system management data structures of shared file system 115 to a format that is specified by the new file system driver. It should be recognized that, at this step, all of servers 100 have successfully loaded the new file system driver which includes the necessary logic to perform the upgrade of the file system management data structures of shared file system 115, and any of servers 100 may be given the command to upgrade file system management data structures. One example of the file system management data structures that are upgraded is a bitmap where each bit in the bitmap indicates whether a particular data block in a volume or logical drive (e.g., LUN 120) of shared file system 115 is currently used or free. For example, if the upgrade operation is to increase the block addressing space from a 32-bit format to a 64-bit format, the bitmap is expanded to cover all of the additional data blocks that can be addressed with the 64-bit format.

At step 412, server $100_A$ obtains all locks to the file system management data structures included in shared file system 115. At step 414, server $100_A$ upgrades the file system management data structures of shared file system 115. Upon completion of the upgrade, at step 416, server $100_A$ upgrades the format ID of each of the file system management data structures to correspond to the new file system driver, i.e., to be the same as the version number of the new file system driver. The locks of the file system management data structures are then released.

At step 418, server $100_A$ informs the controlling entity that the upgrade of the file system management data structure is complete. At step 420, servers 100 each receive a notification from the controlling entity to invalidate cached versions of the file system management data structures and to upgrade all inodes that are currently locked by them. This step ensures that all inodes that were locked prior to the upgrade to the file system management data structure, including such inodes that are cached at any of servers 100, are appropriately upgraded. The upgrades to the locked inodes are described below in method steps 508-522 illustrated in FIG. 5.

Figure 5:
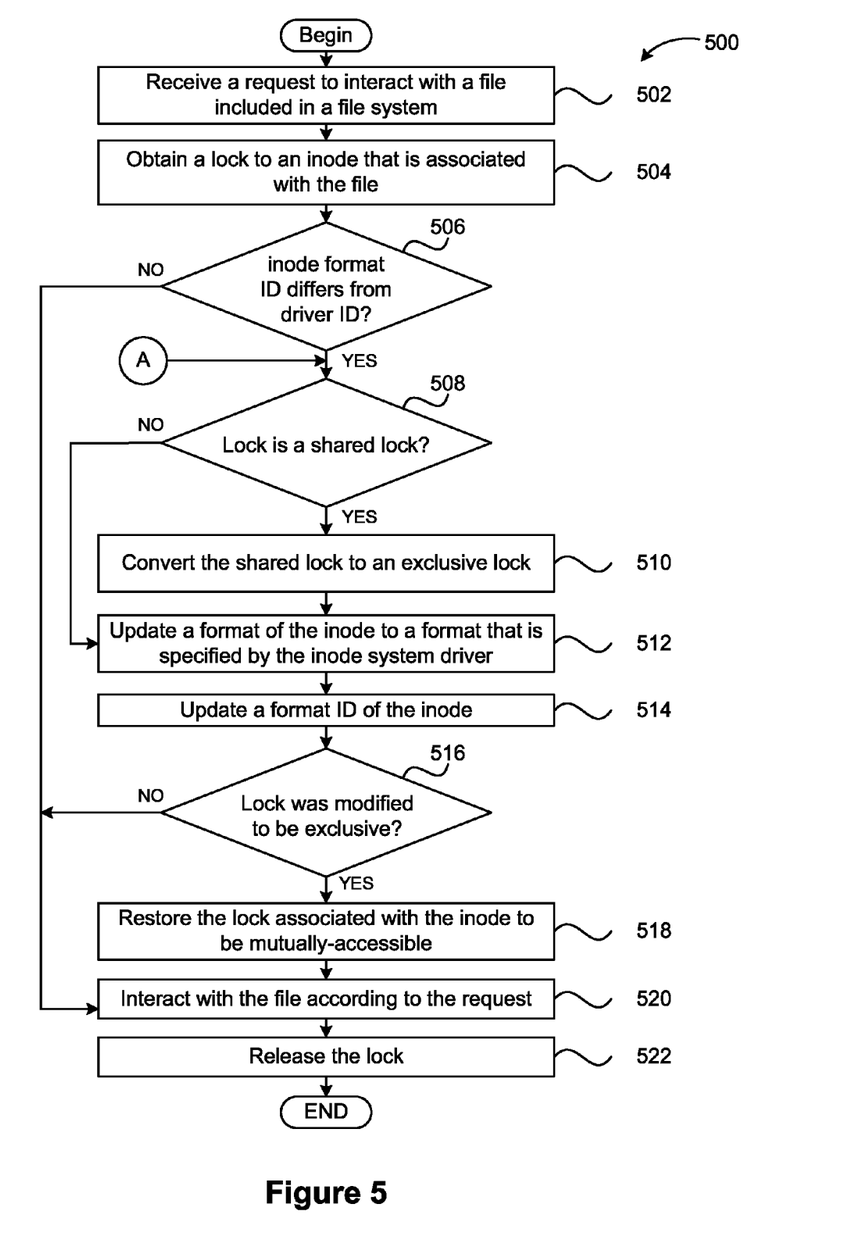
FIG. 5 is a flow diagram of a method for modifying a format of an inode for a file or directory, according to one or more embodiments of the present invention.

FIG. 5 is a flow diagram of a method 500 for modifying a format of an inode 350 for a file or directory stored in shared file system 115, according to one or more embodiments of the present invention. Although the method steps are described in conjunction with the systems of FIG. 1-2, it should be understood that any system configured to perform method 500 is within the scope of the invention.

Method steps 500 are executed by server $100_A$ throughout normal operation. More specifically, each IO request generated by guest operating systems on server $100_A$ is received by VMFS 216 and handled according to the method steps 500. At step 502, guest operating system 208 on server $100_A$ receives an IO request from one of applications 206 to access (e.g., read or write, etc.) a file stored in the virtual disk for VM 203. This IO request is translated by VMFS driver 216 (as previously discussed) into an IO request to access a section of another file stored in VMFS (e.g., in LUN 120) that represents the virtual disk itself and has an associated inode 350 on shared file system 115.

At step 504, VMFS driver 216 on server $100_A$ acquires lock 352 that is associated with inode 350. In some cases, lock 352 is automatically acquired when a VM 203 is powered-on; in this case, VMFS driver 216 instead determines whether it continues to hold lock 352 on inode 350. At step 506, VMFS driver 216 determines whether format ID 351 of inode 350 differs from the format ID that is associated with its file system driver (e.g., a new version of VMFS 216 as a result of step 404). However, in one embodiment, each of the inodes may include a flag that indicates whether the version is obsolete. Thus, the flag may instead be referenced in step 506, thereby enhancing the simplicity and speed of the determination that is made. If the format IDs match, no upgrade is required, and the method proceeds to step 520. However, if the format IDs do not match, the method proceeds to step 508.

At step 508, VMFS driver 216 determines whether lock 352 is a shared lock. In one embodiment, VMFS driver 216 parses lock 352 to determine a locking type, which may indicate that it is of type that can be shared, such as a multi-writer lock and other known shared locks. If, at step 508, VMFS driver 216 determines that inode 350 is mutually-accessible (e.g., lock 352 is a shared lock), then step 510 is carried out, where VMFS driver 216 upgrades lock 352 to be an exclusive lock. If, however, the lock upgrade fails, then the method 500 ends. On the other hand, if VMFS driver 216 determines that inode 350 is not mutually-accessible, then the method skips to step 512. At step 512, VMFS driver 216 upgrades a format of inode 350 according to the new format. For example, VMFS driver 216 could upgrade the block information 360 in inode 350 from a 32-bit address format to a 64-bit address format. Then, at step 514, VMFS driver 216 upgrades the format ID 351 to the new format ID.

At step 516, VMFS driver 216 determines whether the lock was upgraded to be an exclusive lock at step 510. If VMFS driver 216 determines that lock 352 was upgraded at step 510, then step 518 is carried out, where lock 352 is restored to be a shared lock. On the other hand, if VMFS driver 216 determines that lock 352 has not been upgraded at step 510, then the method skips to step 520. At step 520, VMFS driver 216 interacts with the file associated with inode 350 according to the IO request. At step 522, VMFS driver 216 releases any obtained lock 352, i.e., if a lock 352 is obtained in step 504.

Referring now back to step 506, if VMFS driver 216 determines that the format ID 351 is equal to the file system driver format ID, then no upgrade of the format of inode 350 is required. Accordingly, the method skips to step 520, where VMFS driver 216 interacts with the file associated with inode 350 according to IO requests that are issued during normal operations on server $100_A$.

Although the inventive concepts disclosed herein have been described with reference to specific implementations, many other variations are possible. For example, the inventive concepts disclosed herein are applicable to shared file systems used in non-virtualized computing environments. Also, the shared file systems need not employ a directory structure, inodes as file descriptors, or locks to get possession of files and inodes. Instead, they may be flat file shared file systems and employ other types of file descriptors and on-disk locking mechanisms to get possession of files and inodes.

Furthermore, the inventive techniques and systems described herein may be used in both a hosted and a non-hosted virtualized computer system, regardless of the degree of virtualization, and in which the virtual machine(s) have any number of physical and/or logical virtualized processors. In addition, the invention may also be implemented directly in a computer's primary operating system, both where the operating system is designed to support virtual machines and where it is not. Moreover, the invention may even be implemented wholly or partially in hardware, for example in processor architectures intended to provide hardware support for virtual machines. Further, the inventive system may be implemented with the substitution of different data structures and data types, and resource reservation technologies other than the SCSI protocol. Also, numerous programming techniques utilizing various data structures and memory configurations may be utilized to achieve the results of the inventive system described herein. For example, the tables, record structures and objects may all be implemented in different configurations, redundant, distributed, etc., while still achieving the same results.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments, may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

We claim:

1. A method of upgrading a version of a shared file system to an upgraded shared filed system without taking the shared file system offline, wherein the shared file system is supported by at least one storage array and accessed by a plurality of host computer systems, each host computer system including a file system driver for accessing data on the at least one storage array stored in accordance with the shared file system, said method comprising:
    transmitting a request to each host computer system to upgrade its respective file system driver to a new file system driver that corresponds to the upgraded shared file system;
    upon receiving a notification from each of the host computer systems that the host computer system has upgraded its respective file system driver to the new file system driver, transmitting a request to a selected host computer system to upgrade file system management data structures stored in the shared file system for correspondence with the upgraded shared file system; and
    transmitting a request to each host computer system to upgrade file descriptors for each file for which the host computer system currently holds a file lock for correspondence with the upgraded shared file system, wherein each file descriptor that corresponds to a file for which no host computer system currently holds a file lock is upgraded by the new file system driver of a host computer system that subsequently obtains a file lock in order to access the file that corresponds to the file descriptor.

2. The method of claim 1, wherein the upgrade of the file system management data structures by the selected host computer system is performed by the new file system driver in the selected host computer system.

3. The method of claim 1, wherein the upgrade of the file descriptors for each file for which a host computer system currently holds a file lock is performed by the new file system driver in the host computer system.

4. The method of claim 1, wherein the upgrade of the file descriptors for each file for which a lock is not held is performed by the new file system driver in the selected host computer system.

5. The method of claim 1, wherein the file system management data structures include a bitmap of storage blocks that indicates which storage blocks are used or unused.

6. The method of claim 5, wherein the upgrade of the file system management data structures by the selected host computer system comprises extending the bitmap of storage blocks to accommodate a larger address space supported by the upgraded shared file system.

7. The method of claim 1, further comprising transmitting a request to each of the host computer systems to invalidate any versions of the file system management data structures locally cached by the host computer system.

8. The method of claim 1, wherein the selected host computer system obtains locks for the file system management data structures in order to perform the upgrade to the file system management data structures.

9. The method of claim 1, wherein the shared file system is a virtual machine file system and each of the host computer systems has at least one virtual machine running therein.

10. The method of claim 1, wherein the upgraded shared file system is backwards compatible with the shared file system.

11. A method of upgrading a version of a shared file system to an upgraded shared file system without taking the shared file system offline, wherein the shared file system is supported by at least one storage array and accessed by a plurality of host computer systems, each host computer system including an upgraded file system driver compatible with the upgraded shared file system and the at least one storage array storing upgraded file system management data structures compatible with the upgraded shared file system, said method performed in each of the host computer systems and comprising:
   for each file for which the host computer system currently holds a file lock, upgrading the file descriptors for the file for which the host computer system currently holds the file lock for correspondence with the upgraded shared file system; and
   for each file for which no host computer system currently holds a file lock, in response to a request to access the file:
      obtaining access to a file descriptor corresponding to the file and stored in the shared file system;
      comparing a version identifier in the file descriptor with a version identifier of the upgraded file system driver of the host computer system;
      upgrading the file descriptor for correspondence with the upgraded shared file system if the comparison step determines a difference between the version identifier in the file descriptor and the version identifier of the upgraded file system driver; and
      enabling access to the file in accordance with the request.

12. The method of claim 11, further comprising obtaining an exclusive lock for the file, prior to the upgrading step, if the comparison step determines a difference between the version identifier in the file descriptor and the version identifier of the upgraded file system driver.

13. The method of claim 11, further comprising obtaining a shared lock for the file and upgrading the shared lock be an exclusive lock, prior to the upgrading step, if the comparison step determines a difference between the version identifier in the file descriptor and the version identifier of the upgraded file system driver.

14. The method of claim 11, wherein the request originates from an application running on the host computer system during normal operations.

15. The method of claim 11, wherein the shared file system is a virtual machine file system and each of the host computer systems has at least one virtual machine running therein.

16. The method of claim 15, wherein the file represents a virtual disk corresponding to one of the virtual machines in one of the host computer systems.

17. The method of claim 11, wherein upgrading the file descriptor comprises converting address formats of data blocks referenced in the file descriptor to a larger bit address space.

18. A non-transitory computer readable storage medium comprising instructions that are to be executed in a host that is part of a computer system configured with a shared file system, wherein the shared file system is supported by at least one storage array and accessed by a plurality of host computer systems, each host computer system including an upgraded file system driver compatible with the upgraded shared file system and the at least one storage array storing upgraded file system management data structures compatible with the upgraded shared file system, wherein the instructions, when executed in the said host, cause said host to carry out the steps of:
   for each file for which the host computer system currently holds a file lock, upgrading the file descriptors for the file for which the host computer system currently holds the file lock for correspondence with the upgraded shared file system; and
   for each file for which no host computer system currently holds a file lock, in response to
   a request to access the file:
   obtaining access to a file descriptor corresponding to the file and stored in the shared file system;
   comparing a version identifier in the file descriptor with a version identifier of the upgraded file system driver of the host computer system;
   upgrading the file descriptor for correspondence with the upgraded shared file system if the comparison step determines a difference between the version identifier in the file descriptor and the version identifier of the upgraded file system driver; and
   enabling access to the file in accordance with the request.

19. The non-transitory computer readable storage medium of claim 18, further comprising obtaining an exclusive lock for the file, prior to the upgrading step, if the comparison step determines a difference between the version identifier in the file descriptor and the version identifier of the upgraded file system driver.

20. The non-transitory computer readable storage medium of claim 18, further comprising obtaining a shared lock for the file and upgrading the shared lock be an exclusive lock, prior to the upgrading step, if the comparison step determines a difference between the version identifier in the file descriptor and the version identifier of the upgraded file system driver.

21. The non-transitory computer readable storage medium of claim 18, wherein the request originates from an application running on the host computer system during normal operations.

22. The non-transitory computer readable storage medium of claim 18, wherein the shared file system is a virtual machine file system and each of the host computer systems has at least one virtual machine running therein.

23. The non-transitory computer readable storage medium of claim 22, wherein the file represents a virtual disk corresponding to one of the virtual machines in one of the host computer systems.

* * * * *